US012779838B2

(12) United States Patent
Magnone

(10) Patent No.: US 12,779,838 B2

(45) Date of Patent: Nov. 3, 2026

(54) PRINTING UNIT AND METHOD TO CHANGE PRINTING ROLLERS IN A PRINTING UNIT

(71) Applicant: BOBST FIRENZE S.R.L., Campi Bisenzio (IT)

(72) Inventor: Stefano Magnone, Tortona (IT)

(73) Assignee: BOBST FIRENZE S.R.L., Campi Bisenzio (IT)

(*) Notice: Subject to any disclaimer, the term of this patent is extended or adjusted under 35 U.S.C. 154(b) by 0 days.

(21) Appl. No.: 19/148,125

(22) PCT Filed: Jan. 10, 2024

(86) PCT No.: PCT/EP2024/050433

§ 371 (c)(1),
(2) Date: Jul. 15, 2025

(87) PCT Pub. No.: WO2024/153504

PCT Pub. Date: Jul. 25, 2024

(65) Prior Publication Data

US 2026/0233510 A1 Aug. 13, 2026

(30) Foreign Application Priority Data

Jan. 17, 2023 (EP) .................................... 23152017

(51) Int. Cl.
*B41F 13/20* (2006.01)
*B41F 5/24* (2006.01)
(Continued)

(52) U.S. Cl.
CPC ................ *B41F 13/20* (2013.01); *B41F 5/24* (2013.01); *B41F 13/0024* (2013.01);
(Continued)

(58) Field of Classification Search
None
See application file for complete search history.

(56) References Cited

U.S. PATENT DOCUMENTS 5,154,602 A 10/1992 Harrison
2006/0272526 A1* 12/2006 Chen .................... B41F 31/301 101/348

FOREIGN PATENT DOCUMENTS

DE 4328058 A1 * 2/1995 ................ B41F 7/02
DE 102008016598 A1 10/2009
(Continued)

*Primary Examiner* — Joshua D Zimmerman

(74) *Attorney, Agent, or Firm* — Bookoff McAndrews PLLC

(57) ABSTRACT

The invention relates to a printing unit (10) comprising a first printing roller (12) with a first shaft, a second printing roller (18) with a second shaft, a first mandrel configured to hold each of the shafts at a time, a second mandrel configured to hold each of the shafts at a time and a carousel gripper (40) configured to translationally move in a printing position in axis direction of the first and second printing roller (12, 18) to unplug the first shaft from the first mandrel and the second shaft from the second mandrel; to rotate around an axis parallel to the axis of the first and second printing roller (12, 18), thereby switching the position of the printing rollers (12, 18); and to translationally move in axis direction of the first and second printing roller (12, 18) to plug the first shaft to the second mandrel and the second shaft to the first mandrel. Furthermore, the invention relates to a method to change printing rollers (12, 18) in a printing unit (10).

15 Claims, 8 Drawing Sheets

(51) Int. Cl.

| | |
|---|---|
| ***B41F 13/00*** | (2006.01) |
| ***B41F 13/18*** | (2006.01) |
| ***B41F 13/30*** | (2006.01) |
| ***B41F 13/32*** | (2006.01) |
| ***B41F 13/38*** | (2006.01) |
| ***B41F 13/40*** | (2006.01) |
| ***B41F 31/30*** | (2006.01) |

(52) U.S. Cl.
CPC .............. *B41F 13/18* (2013.01); *B41F 13/30* (2013.01); *B41F 13/32* (2013.01); *B41F 13/38* (2013.01); *B41F 13/40* (2013.01); *B41F 31/30* (2013.01)

(56) References Cited

FOREIGN PATENT DOCUMENTS

| | | | | |
|---|---|---|---|---|
| EP | 0468655 | A1 | 1/1992 | |
| EP | 1767362 | A2 * | 3/2007 | .............. B41F 31/30 |
| GB | 2580366 | A | 7/2020 | |
| WO | 2018163611 | A1 | 9/2018 | |
| WO | 2018184738 | A1 | 10/2018 | |

* cited by examiner

PRINTING UNIT AND METHOD TO CHANGE PRINTING ROLLERS IN A PRINTING UNIT

CROSS-REFERENCE TO RELATED APPLICATION(S)

This application is a National Stage Application under 35 U.S.C. § 371 of International Application No. PCT/EP2024/050433, filed on Jan. 10, 2024, which claims priority to European Application No. 23152017.2, filed on Jan. 17, 2023, the entireties of which are incorporated herein by reference.

The invention relates to a printing unit. Furthermore, the invention relates to a method to change printing rollers in a printing unit.

In many modern printing systems, in particular flexographic printing systems, a number of different rollers, for example fountain rollers, anilox rollers, printing rollers and impression cylinders, is used to apply ink on a substrate.

To establish a new printing pattern or due to maintenance reasons, it can be necessary to change or exchange one or several of the rollers during or in between a printing process.

Changing or exchanging a roller, in particular the printing roller, is typically complex and time consuming. Precise alignment of the newly installed roller is necessary to ensure an optimal printing result. At the same time, the changeover time needs to be as low as possible to increase productivity of the printing system.

For example, EP 1 767 362 A2 discloses a system for exchanging rollers in a printing machine using a rotating lift arm device. The printing rollers are connected/disconnected from the printing machine using bolts and/or pins and can thus be time-consuming.

Therefore, there is a need for a means that allows a simple, robust and time saving change or exchange of rollers in a printing system.

The object of the invention is solved by a printing unit comprising a first printing roller with a first shaft, a second printing roller with a second shaft, a first mandrel configured to hold each of the shafts, a second mandrel configured to hold each of the shafts. Each mandrel can hold only one shaft at a time. The printing unit furthermore comprises a carousel gripper configured

- to translationally move in a printing position in axis direction of the first and second printing roller to unplug the first shaft from the first mandrel and the second shaft from the second mandrel;
- to rotate around an axis parallel to the axis of the first and second printing roller, thereby switching the position of the printing rollers; and
- to translationally move in axis direction of the first and second printing roller to plug the first shaft to the second mandrel and the second shaft to the first mandrel.

In this context, "printing position" means a position within a printing system at which a printing process is conducted and/or a position in close proximity to the spot at which ink is applied onto a substrate. In particular, the printing position can be a location in between an ensemble of rollers, for example between an anilox roller and an impression cylinder of a flexographic printing system.

One of the ideas behind the invention is to enable a user to set up the second printing roller, for example by installing a printing sleeve on the second shaft, while the printing process is still running with the first printing roller.

Change or exchange of the first and second printing roller is achieved with the carousel gripper. It grips both of the rollers and switches their position. Only in this phase, the printing process has to be stopped for a short duration. In particular, the alignment of the rollers can be preserved during the switching process, which reduces the overall downtime of the machine and occurrence of alignment errors.

In an embodiment of the printing unit, the carousel gripper is further configured to translationally move perpendicular to the axis direction of the first and second printing roller from the printing position into a home position and to translationally move perpendicular to the axis direction of the first and second printing roller from the home position back to the printing position.

In this context, "home position" means a position within a printing system at which there is sufficient space to switch two rollers by rotating them around a common axis.

For example, the carousel gripper can move into the home position prior to rotation and back to the printing position after the rotation is completed, thus ensuring that the carousel gripper and/or the printing rollers do not collide with other machine parts during the roller exchange.

The printing unit can further comprise an anilox roller and an impression cylinder.

In one variant, the first printing roller or the second printing roller is located between the anilox roller and the impression cylinder. The three rollers contact each other during printing. The anilox roller and the first and/or second printing roller are configured to move apart from each other and from the impression cylinder, such that a free space for rotating the carousel gripper is formed. In this variant, the roller exchange can be performed without translationally moving the carousel gripper.

Alternatively, the anilox roller, the impression cylinder and the first and/or second printing roller can be positioned in a triangle. The first and/or second printing roller(s) are/is configured to move apart from the anilox roller and the impression cylinder. In this variant, the roller exchange can be performed without moving the anilox roller and the impression cylinder.

In a preferred embodiment, the printing unit comprises a first motor connected to the first mandrel and configured to rotate the first mandrel to control a printing process.

Plugging/unplugging the first and second shaft to/from the mandrels allows using only a single motor (the first motor) to drive each of the rollers. In other words, it is not necessary to apply two motors, each fixedly connected to one of the printing rollers and/or to move the motor(s) during change of the printing rollers.

In one variant, the printing unit further comprises a motorized linear guide connected to the first mandrel and configured to move the first mandrel in axis direction of the first printing roller. For example, the linear guide can move the first mandrel and attached printing roller in axis direction such that the printing roller connects to or releases from a counter holder. In addition, the motorized linear guide can be used to adjust the lateral position of the applied printing roller with respect to other rollers of the printing system, for example relative to the anilox roller and/or impression cylinder.

It is also conceivable, that the printing unit comprises a source of pressurized gas connected to the second mandrel such that pressurized gas can pass through the second mandrel and enter the first or second shaft. The shafts may each have a cylindrical surface with openings through which the pressurized gas can escape. The escaping pressurized gas can reduce the contact surface and friction between the shaft and a corresponding sleeve, thus facilitating the sleeve exchange.

In another variant, the printing unit further comprises a second motor connected to the carousel gripper and configured to rotate the carousel gripper in the home position. In particular, the motor can turn the carousel gripper 180°. This enables automatic switching of the printing rollers and helps to keep the idle time of the printing system as short as possible.

The second motor can further be configured to rotate the carousel gripper in the printing position such that it simultaneously grips and/or ungrips the first and second shaft. In particular, the second motor can be moved together with the carousel gripper between the home and the printing position. By using the same motor (the second motor) in both positions for different purposes (gripping/ungripping and switching the printing rollers), the application of additional drive means can be avoided. This facilitates the overall setup complexity and costs.

In another preferred embodiment, the printing unit further comprises a pneumatic piston connected to a rotating shaft of the carousel gripper. The pneumatic piston is configured to translationally move the carousel gripper in axis direction of the first and second printing roller.

The pneumatic piston can be used to engage and/or to disengage the carousel gripper with the printing rollers to/from the mandrels. In particular, the pneumatic piston can move the shaft of the printing rollers towards and/or away from the mandrels, such that the mandrels can catch and/or release the shafts in a fast and precise manner.

In another preferred embodiment, the printing unit comprises a linear guide with a U-shaped frame and a plate configured to move in the U-shaped frame. The plate has a hole through which the rotating shaft of the carousel gripper passes. This arrangement allows to precisely move the carousel gripper with the printing rollers between the printing and the home position. The U-shaped frame thereby prevents any undesired movement perpendicular to the axis direction.

In particular, the walls of the hole inside the plate can be configured as a bearing for the shaft of the carousel gripper. By shifting the plate within the U-shaped frame, the carousel gripper and attached elements, for example the second motor and/or the pneumatic piston, can be moved simultaneously.

In a technically simple and space saving embodiment, the second motor is located between the pneumatic piston and the linear guide.

It is also conceivable, that a part of the pneumatic piston passes through the rotor of the second motor and/or forms a central part of the rotor.

To increase the robustness of the printing unit, it is also possible to form the piston or part of the piston and the shaft of the carousel gripper from a single piece. This reduces the overall amount of individual elements and therefore construction complexity.

The object of the invention is solved by a method to change printing rollers in a printing unit comprising the steps:

- Rotate a carousel gripper in a printing position such that it simultaneously grips a first shaft of a first printing roller and a second shaft of a second printing roller;
- Translationally move the carousel gripper in the printing position in axis direction of the printing rollers to unplug the first shaft from a first mandrel and the second shaft from a second mandrel;
- Rotate the carousel gripper around an axis parallel to the axis of the printing rollers, thereby switching the position of the printing rollers;
- Translationally move the carousel gripper in axis direction of the printing rollers to plug the first shaft to the second mandrel and the second shaft to the first mandrel.

The method can further comprise the steps:

- Translationally move the carousel gripper perpendicular to the axis direction of the printing rollers from the printing position into a home position;
- Translationally move the carousel gripper perpendicular to the axis direction of the printing rollers from the home position back into the printing position.

The advantages that were discussed for the printing unit also apply for the method to change printing rollers.

Further features and advantages will become apparent from the following description of the invention and from the appended figures, which show non-limiting exemplary embodiments of the invention and in which:

FIG. 1 schematically shows a side view of an embodiment of a printing unit according to the invention;

Figure 1:
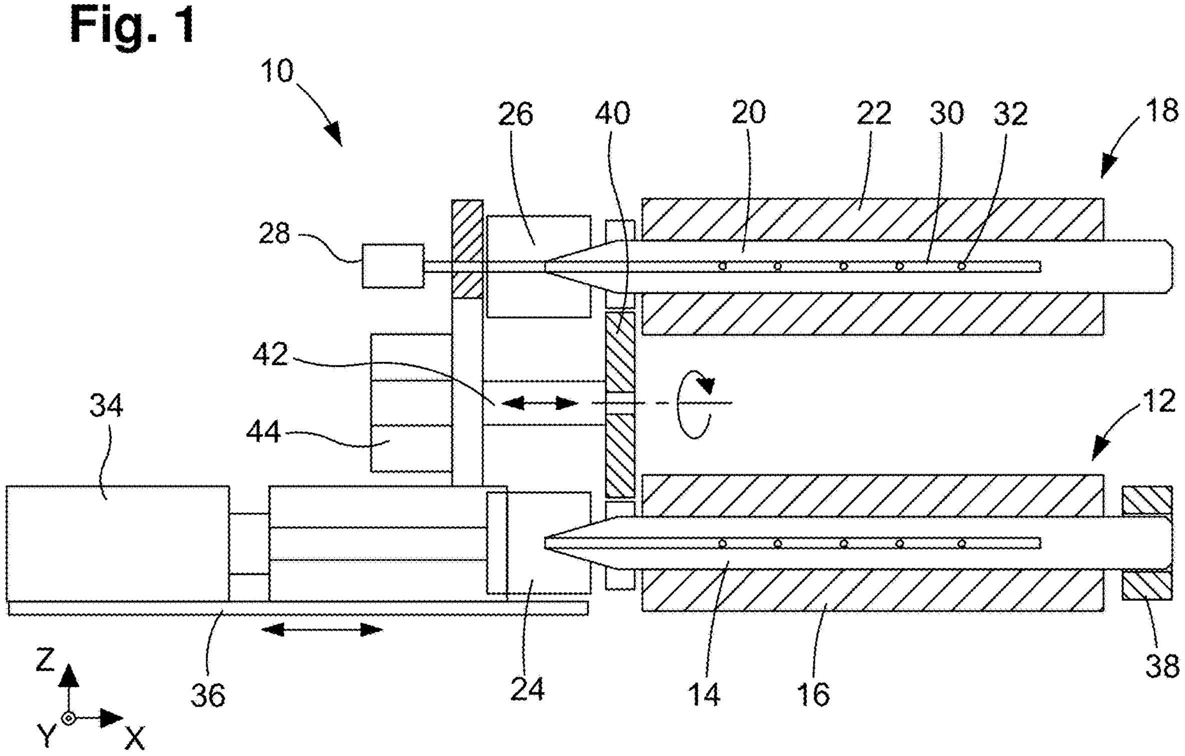

FIG. 1 schematically shows a side view of a first embodiment of a printing unit 10 according to the invention. The printing unit 10 comprises a first printing roller 12 with a first shaft 14 and a first sleeve 16 circumferentially surrounding the first shaft 14. The printing unit 10 furthermore comprises a second printing roller 18 with a second shaft 20 and a second sleeve 22 circumferentially surrounding the second shaft 20.

In the embodiment, the outer circumferential surfaces of the first and second sleeve 16, 22 consists of a flexible rubber-like material forming flexographic printing plates.

The printing unit 10 also comprises a first mandrel 24 and a second mandrel 26, each mandrel 24, 26 being configured to hold the first as well as the second shaft 14, 20. In FIG. 1, the first mandrel 24 holds the first shaft 14. The second mandrel 26 holds the second shaft 20.

The printing unit 10 further comprises a source of pressurized gas 28, in particular compressed air, connected to the second mandrel 26 such that pressurized gas can pass through the second mandrel 26 and enter the connected shaft (in FIG. 1 the second shaft 20).

In the embodiment, the second mandrel 26 and the second shaft 20 comprise a common central channel 30 through which the gas can flow from the source 28 into the second shaft 20.

The second shaft 20 has a plurality of small openings 32 at its circumferential surface through which the gas can escape. The escaping gas reduces the contact surface and thus friction between the second shaft 20 and corresponding sleeve 22, thus facilitating exchanging of sleeves.

In the described example, the first printing roller 12 is located between an anilox roller and an impression cylinder. The anilox roller is located in Y-direction (coordinate system is shown in FIG. 1) behind the printing roller 12. The impression cylinder is located in Y-direction in front of the first printing roller 12. The anilox roller and the impression cylinder are not shown in FIG. 1, because they are both out of the viewing plane.

The printing unit 10 further comprises a first motor 34 connected to the first mandrel 24 and configured to rotate the first mandrel 24. Hence, the first motor 34 drives the printing roller connected to the first mandrel 24 (in FIG. 1 the first printing roller 12). It the described embodiment, it is possible to control the printing speed and throughput of the printing unit 10 by regulating the rotational speed of the first motor 34.

The printing unit 10 further comprises a motorized linear guide 36 connected to the first mandrel 24 and configured to move the first mandrel 24 in axis direction of the first printing roller 12 (in FIG. 1 in X-direction).

In the embodiment, the motorized linear guide 36 can move the first mandrel 24 and attached first printing roller 12 such that the printing roller 12 connects to or releases from a counter holder 38.

It is conceivable that the motorized linear guide 36 is driven by a motor of a register control. In general, the register control is used to properly align the color planes of the different printing units of a printing press. In other words, the motor is needed independently from the printing roller change job.

In the embodiment, the motorized linear guide 36 can be used to adjust the position of the first printing roller 12 in X-direction such that a precise alignment to the anilox roller and/or impression cylinder is achieved.

The printing unit 10 further comprises a carousel gripper 40 with a rotating shaft 42 and a second motor 44 connected to the rotating shaft 42.

Figure 2:
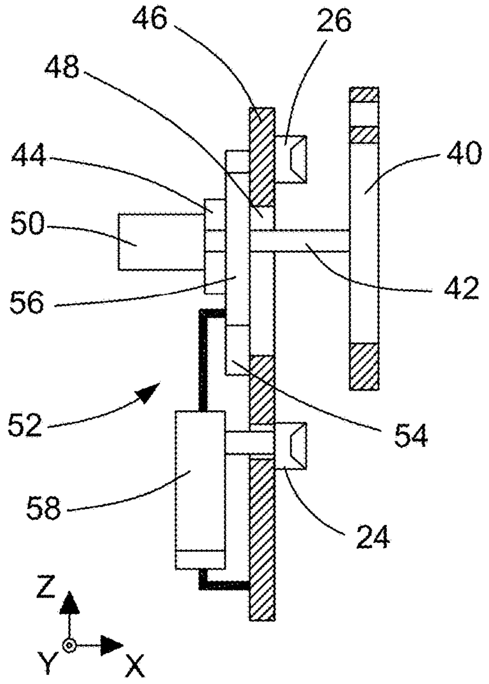
FIG. 2 shows side view of a carousel gripper and linear guide, which are part of the printing unit of FIG. 1.

FIG. 2 shows the mounting of the carousel gripper 40 in a side view. The carousel gripper 40 and the second motor 44 are located at different sides of a machine frame 46. The rotating shaft 42 passes through an opening 48 in the machine frame 46 and connects the carousel gripper 40 to the second motor 44.

The printing unit 10 further comprises a pneumatic piston 50 connected to the rotating shaft 42 of the carousel gripper 40.

The pneumatic piston 50 is configured to translationally move the carousel gripper 40 in axis direction of the printing rollers 12, 18 (in FIG. 2 in X-direction).

The printing unit 10 further comprises a linear guide 52 mounted on the machine frame 46. The second motor 44 is located between the pneumatic piston 50 and the linear guide 52 in a space saving arrangement.

The linear guide 52 comprises a U-shaped frame 54 and a plate 56 configured to move in the U-shaped frame 54 in Z-direction. In the embodiment, the movement is controlled by a pneumatic cylinder 58 connected to the plate 56.

Figure 3:
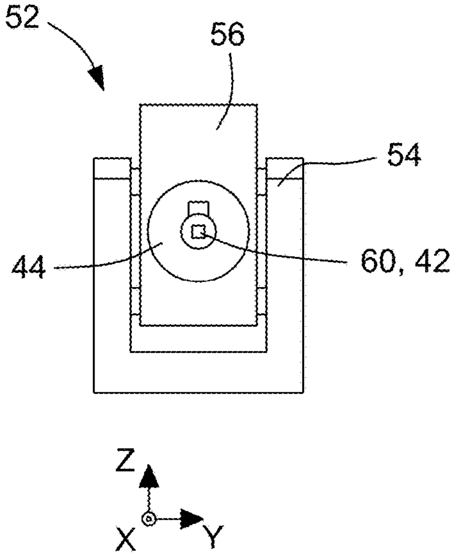
FIG. 3 shows a front view of the linear guide of FIG. 2.

FIG. 3 shows a front view of the linear guide 52. The plate 56 comprises a hole 60. In the embodiment, the rotating shaft 42 of the carousel gripper 40 passes through the hole 60 and connects to the rotor of the second motor 44.

Hence, when the plate 56 is moved in Z-direction, also the rotating shaft 42 and consequently the carousel gripper 40 and the second motor 44 are moved in the same direction.

Figure 4:
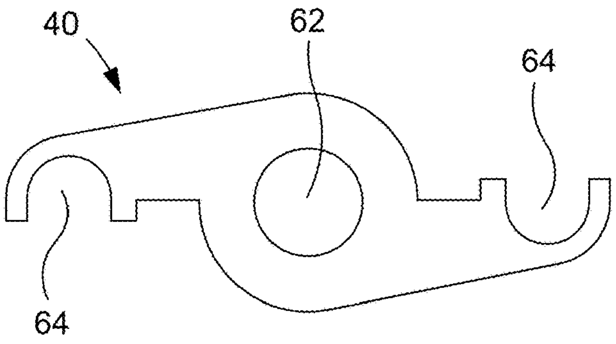
FIG. 4 shows a front view of the carousel gripper of FIG. 2.

FIG. 4 shows a front view of the carousel gripper 40. In the embodiment, the carousel gripper 40 is symmetric to a central point 62. The carousel gripper 40 has two oppositely facing openings 64 configured to grip and/or ungrip the shafts 14, 20 of the printing rollers 12, 18 when rotated around the central point 62.

In order to fulfil the purpose of changing the printing rollers 12, 18 in the printing unit 10, the carousel gripper 40 is configured perform multiple different movements.

In the following, a method to change printing rollers 12, 18 according to the invention is described from which these movements will become apparent. FIGS. 5 to 17 schematically show the printing unit 10 during the different steps if the method.

Figure 5:
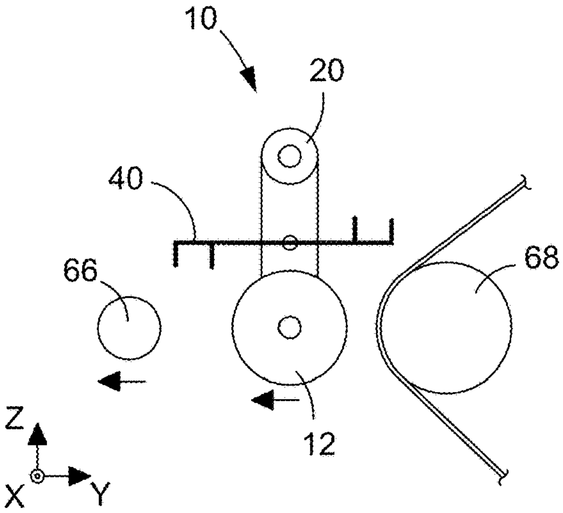
FIGS. 5 and 6 show front views of the printing unit of FIG. 1 during a first step of a printing roller change process.
Figure 6:
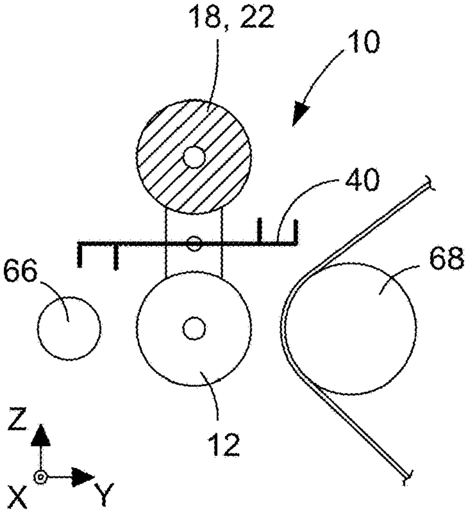

FIGS. 5 and 6 show front views of the printing unit 10 during a first step of the method. The first printing roller 12 is located between the anilox roller 66 and the impression cylinder 68 in a printing position. The axis of the anilox roller 66, printing roller 12, and impression cylinder 68 are aligned on a horizontal line. This allows the printing pressure setting to be independent of the weight/diameter of the applied printing roller 12. In the first step, the anilox roller 66 and the printing unit 10 are moved away from the impression cylinder 68 (in opposite Y-direction), such that they separate from each other.

An operator (not shown) inserts the second printing roller 18 into the printing unit 10, for example by mounting the second sleeve 22 on the second shaft 20. During the mounting process, pressurized air can be delivered from the source of pressurized gas through the second mandrel to the second shaft 20 (not shown in FIGS. 5 and 6), in order to allow the second sleeve 22 to slide over the second shaft 20.

Figure 7:
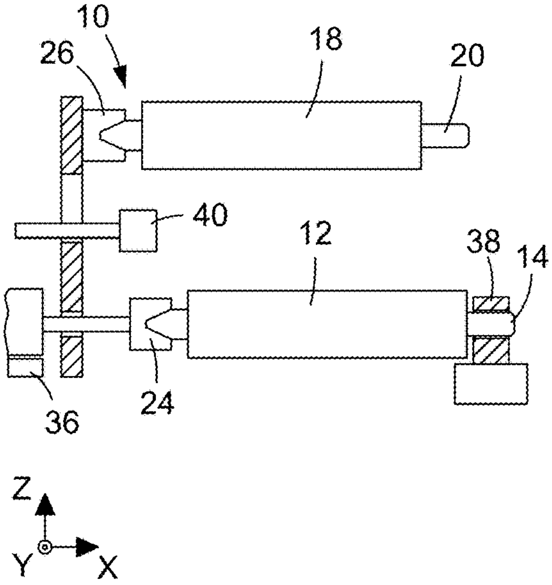
FIGS. 7 and 8 show side views of the printing unit of FIG. 1 during a second step of a printing roller change process.
Figure 8:
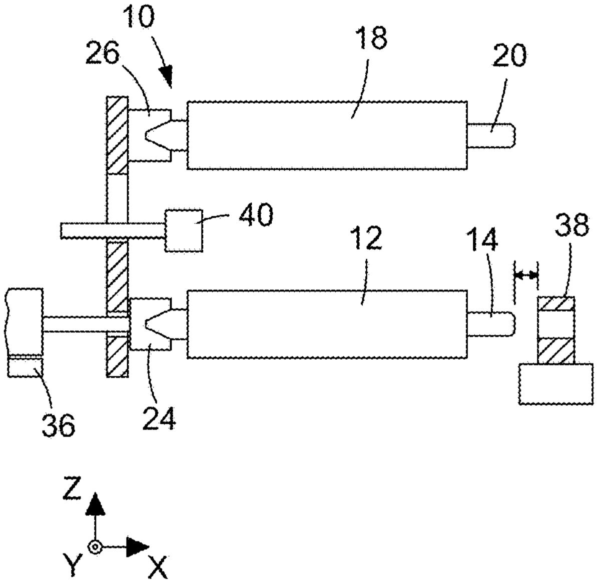

FIGS. 7 and 8 show side views of the printing unit 10 during a second step of the method. The first printing roller 12 is located between the first mandrel 24 and the counter holder 38. The first shaft 14 is held by the first mandrel 24. In the second step, the motorized linear guide 36 moves the first mandrel 24 and connected first printing roller 12 in opposite X-direction such that the first shaft 14 disconnects from the counter holder 38.

Figure 9:
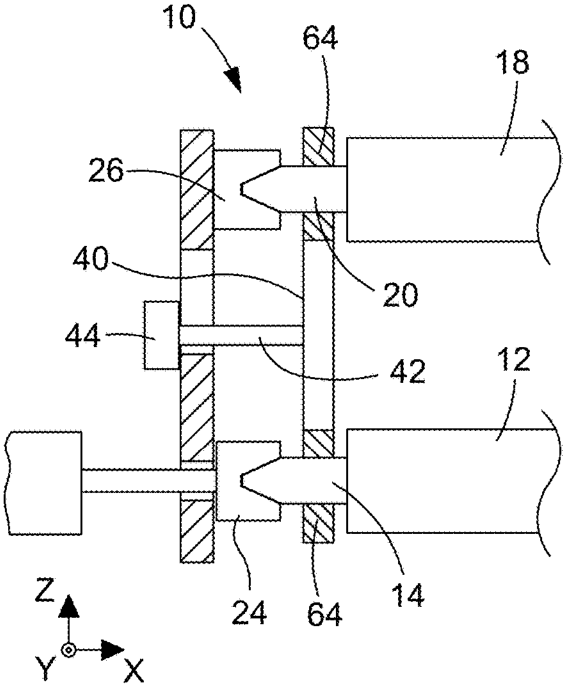
FIGS. 9 and 10 show a side view and a front view of the printing unit of FIG. 1 during a third step of a printing roller change process.
Figure 10:
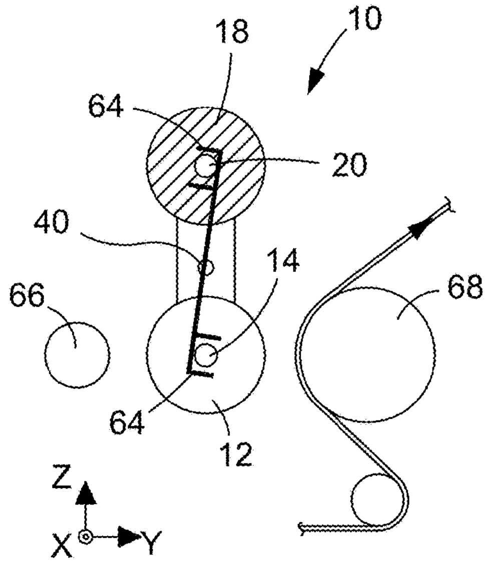

FIGS. 9 and 10 show a side view and a front view of the printing unit 10 during a third step of the method. In this step, the second motor 44 rotates the rotating shaft 42 and thus the carousel gripper 40 in the Y-Z-plane (around the X-axis) such that the oppositely facing openings 64 simultaneously grip the first shaft 14 and the second shaft 20.

Figure 11:
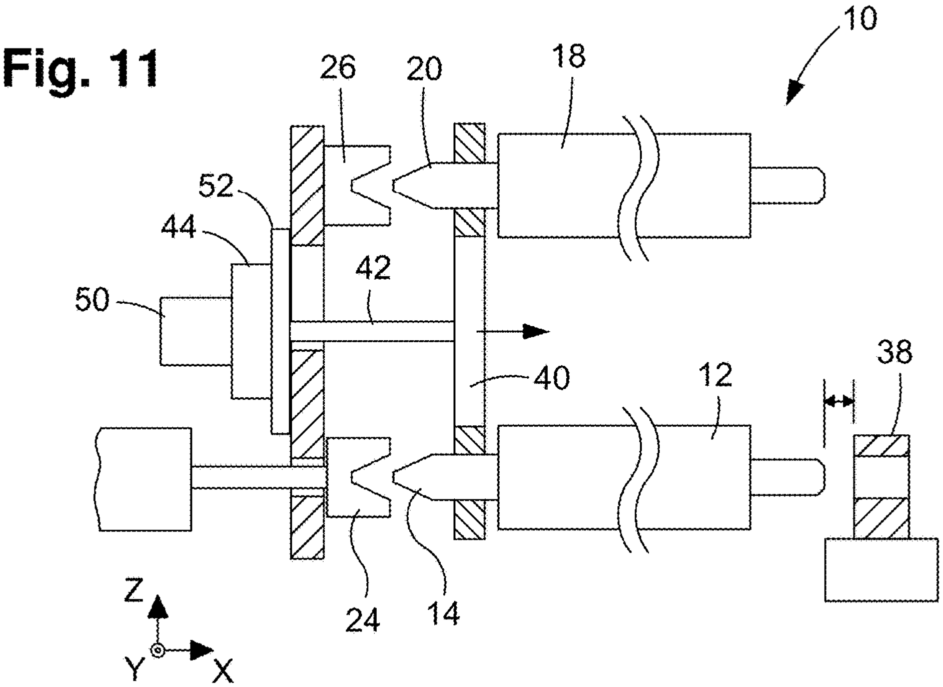
FIG. 11 shows a side view of the printing unit of FIG. 1 during a fourth step of a printing roller change process.

FIG. 11 shows a side view of the printing unit 10 during a fourth step of the method. In this step, the pneumatic piston 50 pushes the rotating shaft 42 and thus the carousel gripper 40 in X-direction such that the first and second shaft 14, 20 of the printing rollers 12, 18 unplug from the mandrels 24, 26. The shift is large enough for complete disengagement from the mandrels 24, 26, but small enough to avoid reengagement of the first shaft 14 into the counter holder 38.

Figure 12:
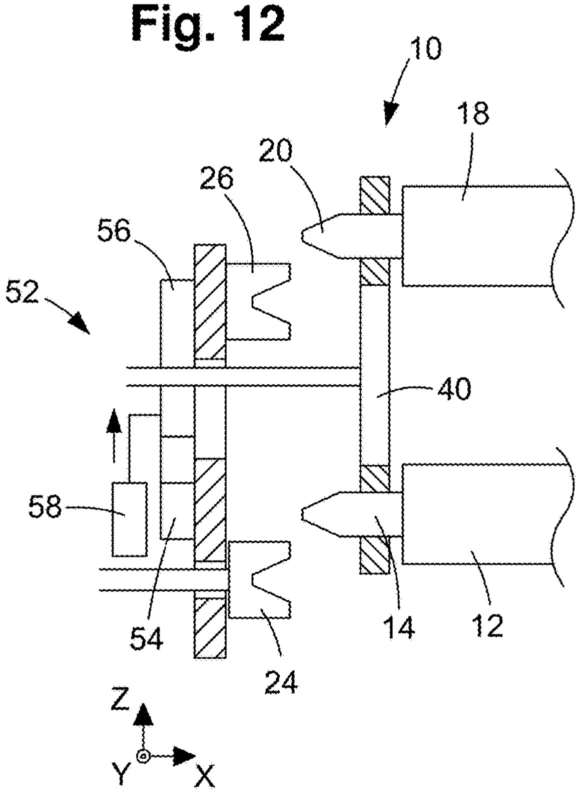
FIGS. 12 and 13 show a side view and a front view of the printing unit of FIG. 1 during a fifth step of a printing roller change process.
Figure 13:
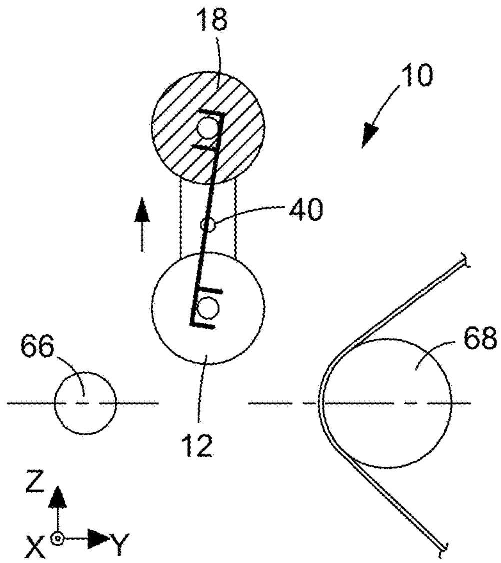

FIGS. 12 and 13 show a side view and a front view of the printing unit 10 during a fifth step of the method. In this step, the pneumatic cylinder 58 moves the plate 56 within the U-shaped frame 54 of the linear guide 52 in Z-direction. Due to this movement, the carousel gripper 40 lifts the first and second printing roller 12, 18 into a home position, in which they are at a defined distance from the anilox roller 66 and the impression cylinder 68.

Figure 14:
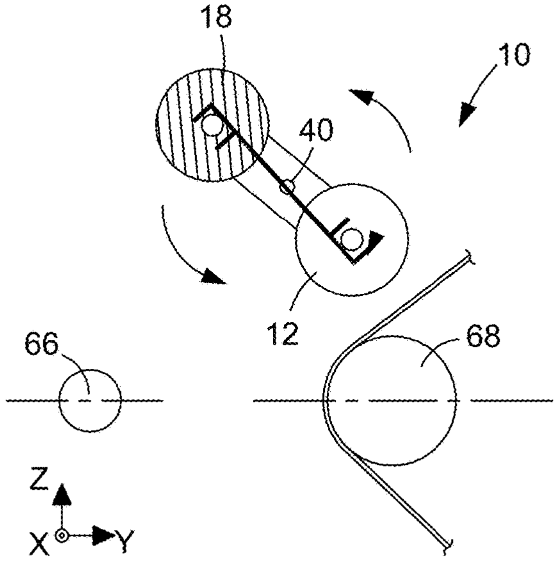
FIGS. 14 and 15 show front views of the printing unit of FIG. 1 during a sixth step of a printing roller change process.
Figure 15:
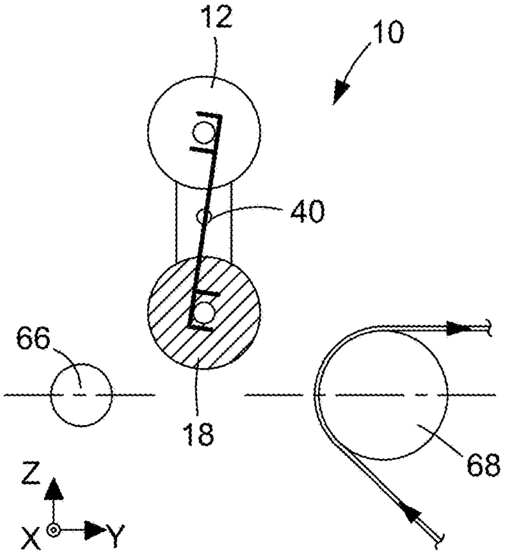

FIGS. 14 and 15 show front views of the printing unit 10 during a sixth step of the method. In this step, the second motor (not shown) rotates the carousel gripper 40 in the home position by 180° around an axis parallel to the axis of the printing rollers 12, 18 (in the embodiment the X-axis), thus switching the position of the printing rollers 12, 18.

Figure 16:
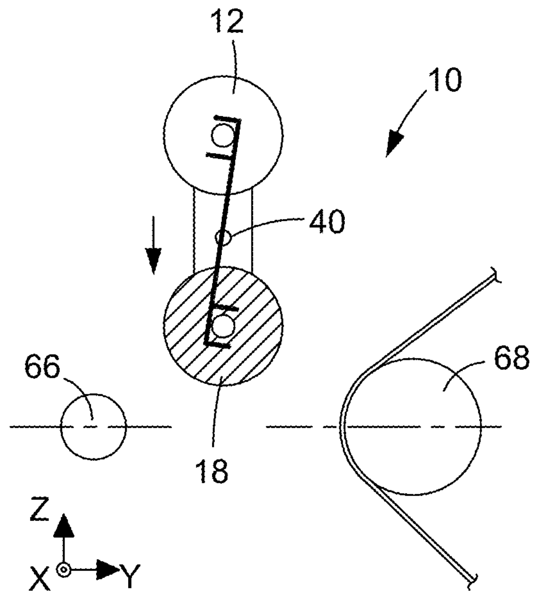
FIG. 16 shows a front view of the printing unit of FIG. 1 during a seventh step of a printing roller change process.

FIG. 16 shows a front view of the printing unit 10 during a seventh step of the method in which the carousel gripper 40 and connected printing rollers 12, 18 are moved in reverse Z direction back into the printing position.

Figure 17:
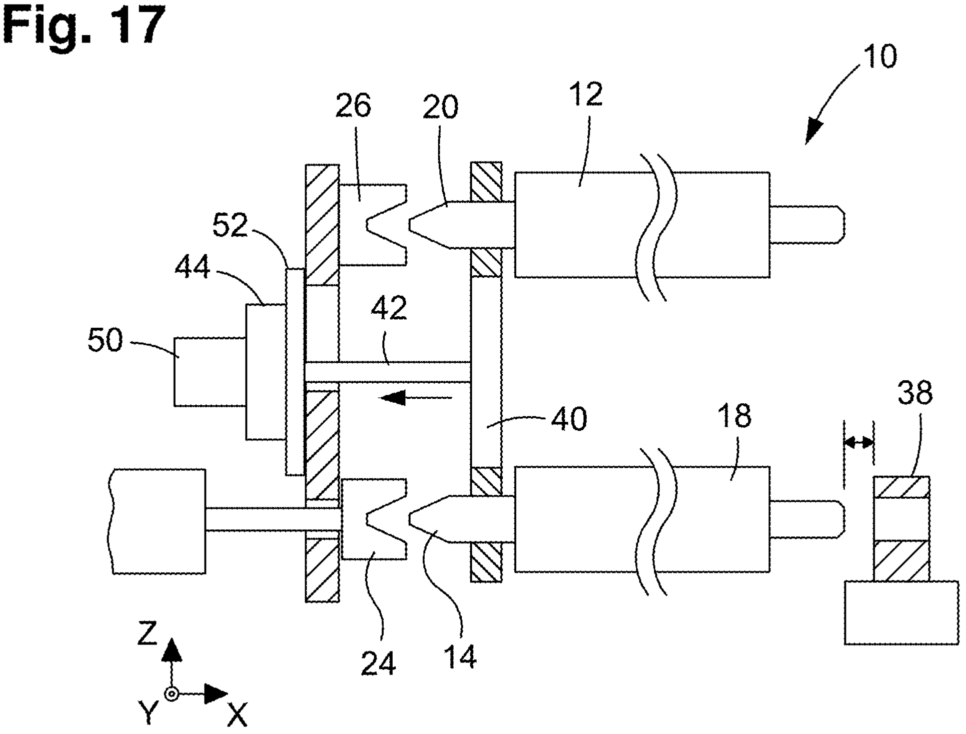
FIG. 17 shows a side view of the printing unit of FIG. 1 during an eight step of a printing roller change process.

FIG. 17 shows a side view of the printing unit 10 during an eighth step of the method. In this step, the carousel gripper 40 is moved in reverse X-direction such that the first shaft 14 of the first printing roller 12 is plugged into the second mandrel 26 and the second shaft 20 of the second printing roller 18 is plugged into the first mandrel 24.

Figure 18:
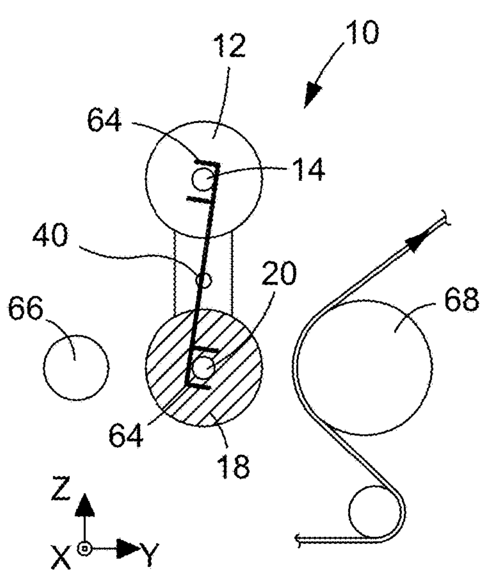
FIG. 18 shows a front view of the printing unit of FIG. 1 during a ninth step of a printing roller change process.

FIG. 18 shows a front view of the printing unit 10 during a ninth step of the method, in which the second motor rotates the rotating shaft and thus the carousel gripper 40 in the Y-Z-plane (around the X-axis) such that the oppositely facing openings 64 ungrip the first shaft 14 and the second shaft 20.

Figure 19:
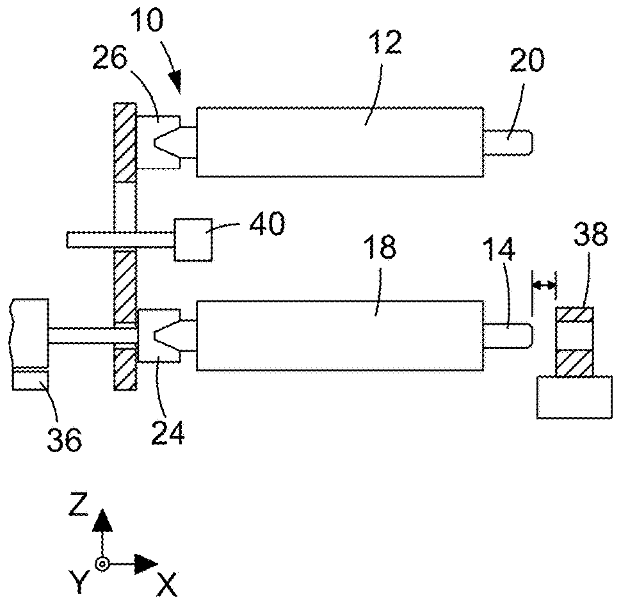
FIG. 19 shows a front view of the printing unit of FIG. 1 during a tenth step of a printing roller change process.

FIG. 19 shows a side view of the printing unit 10 during a tenth step of the method, in which the motorized linear guide 36 moves the first mandrel 24 and attached second printing roller 18 in X-direction, thus plugging the second shaft 20 into the counter holder 38 and fixing the second printing roller 18 in printing position.

Figure 20:
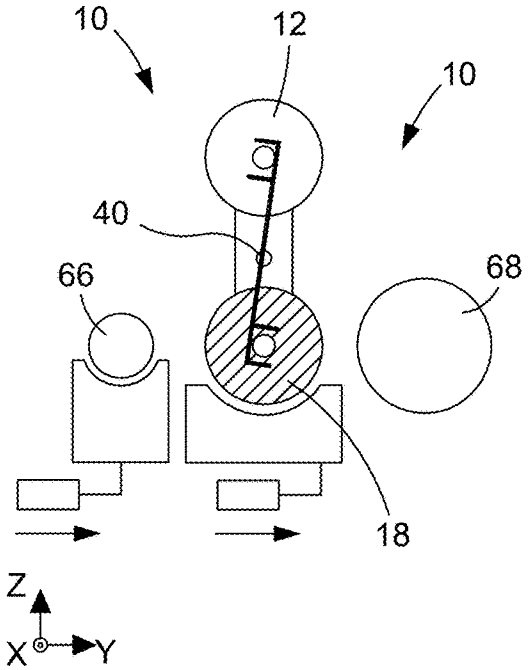
FIG. 20 shows a front view of the printing unit of FIG. 1 during an eleventh step of a printing roller change process.

FIG. 20 shows a front view of the printing unit 10 during an eleventh step of the method. In this step, the anilox roller 66 and the printing unit 10 are moved towards the impression cylinder 68 (in Y-direction), such that they connect to each other.

It is conceivable, that the seventh step corresponds to the fifth step, the eight step corresponds to the fourth step, the ninth step corresponds to the third step, the tenth step corresponds to the second step and the eleventh step corresponds to the first step, but with reverse movement direction of the individual parts.

Figure 21:
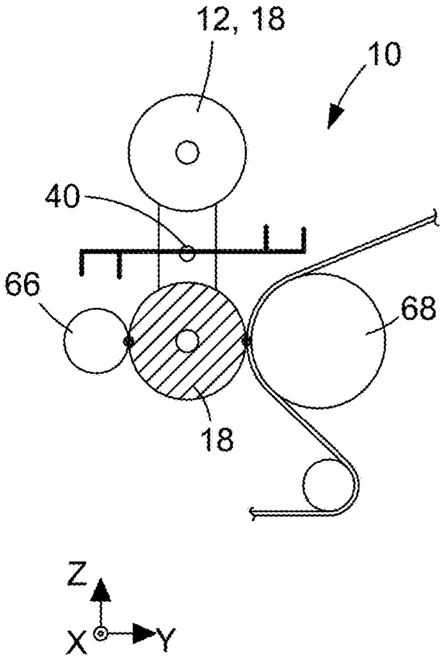
FIG. 21 shows a front view of the printing unit of FIG. 1 after finishing the printing roller change process.

FIG. 21 shows a front view of the printing unit 10 after completing the method. In this state, the second printing roller 18 can be applied for printing. The first printing roller 12 (and/or the sleeve 16 of the first printing roller 12) can be accessed by an operator for servicing or exchange.

Of course, the above described embodiment only serves as an example. In particular, the method according to invention can have more or less steps than described above. It is furthermore conceivable to repeat the method on a frequent basis to service and/or exchange the printing rollers 12, 18 during or between printing processes.

FIGS. 22 to 25 show a second embodiment of a printing unit 10 according to the invention.

The second embodiment corresponds in several essential features to the first embodiment, so that only the differences will be discussed below. Identical and functionally identical parts are provided with the same reference symbols.

Figure 22:
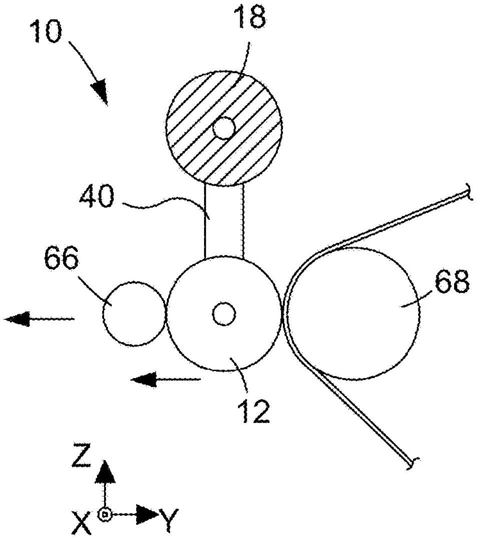
FIG. 22 shows a front view of a second embodiment of a printing unit according to the invention in a first state.

FIG. 22 shows the printing unit 10 in a first state. The printing unit 10 comprises an anilox roller 66, an impression cylinder 68, a first printing roller 12, a second printing roller 18 and a carousel gripper 40. In the first state, the first printing roller 12 is located between the anilox roller 66 and the impression cylinder 68 and directly contacting both. In order to exchange the first and second printing roller 12, 18, the anilox roller 66 and the first printing roller 12 are configured to move apart from each other and from the impression cylinder 68.

Figure 23:
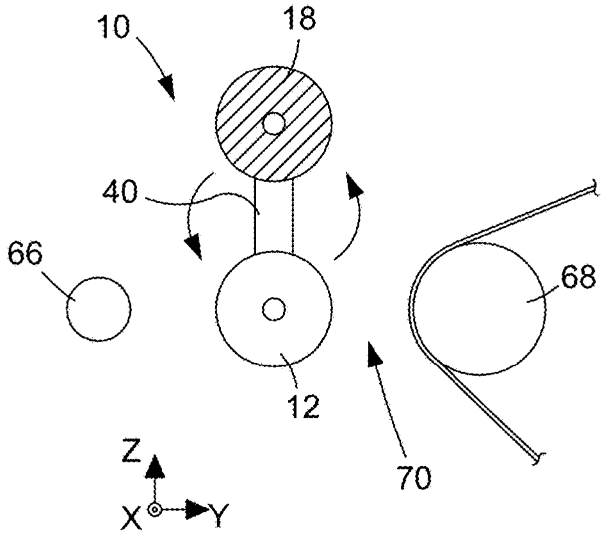
FIG. 23 shows a front view of the printing unit of FIG. 22 in a second state.

FIG. 23 shows the printing unit 10 in a second state after movement of the anilox roller 66 and the first printing roller 12. In this state, a free space 70 for rotating the carousel gripper 40 is formed between the anilox roller 66, an impression cylinder 68. Due to the free space 70, the carousel gripper 40 can rotate to exchange the first and second printing roller 12, 18 without any prior translational movement.

Figure 24:
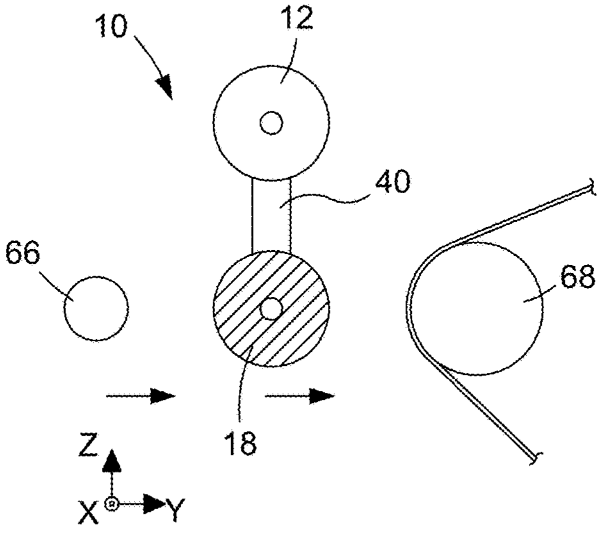
FIG. 24 shows a front view of the printing unit of FIG. 22 in a third state.

FIG. 24 shows the printing unit 10 in a third state after rotation of the carousel gripper 40. In this state, the second printing roller 18 is located between the anilox roller 66 the impression cylinder 68. The second printing roller 18 and the anilox roller 66 can move towards the impression cylinder 68.

Figure 25:
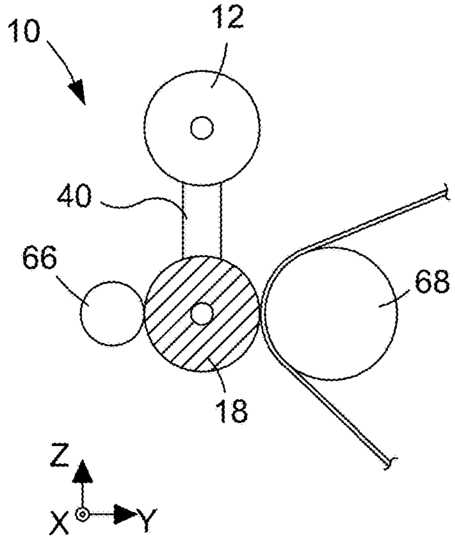
FIG. 25 shows a front view of the printing unit of FIG. 22 in a fourth state after finishing the printing roller change process.

FIG. 25 shows the printing unit 10 in a fourth state after completing the printing roller exchange. In this state, the second printing roller 18 is directly contacting the anilox roller 66 and impression cylinder 68. The first printing roller 12 can be accessed for servicing.

FIGS. 26 to 29 show a third embodiment of a printing unit 10 according to the invention.

The third embodiment corresponds in several essential features to the first and second embodiment, so that only the differences will be discussed below. Identical and functionally identical parts are provided with the same reference symbols.

Figure 26:
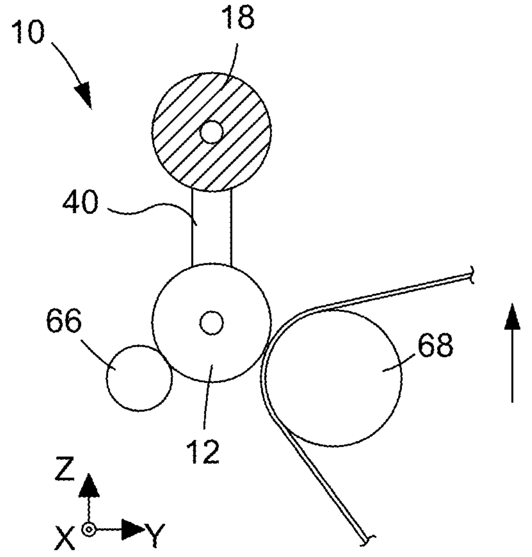
FIG. 26 shows a front view of a third embodiment of a printing unit according to the invention in a first state.

FIG. 26 shows the printing unit 10 in a first state. The printing unit 10 comprises an anilox roller 66, an impression cylinder 68, a first printing roller 12, a second printing roller 18 and a carousel gripper 40. In the first state, the anilox roller 66, the impression cylinder 68 and the first printing roller 12 are positioned in a triangle. In the first state, the first printing roller 12 is directly contacting the anilox roller 66 and the impression cylinder 68.

The carousel gripper 40 and thus the first and second printing roller 12, 18 can be moved away from the anilox roller 66 and the impression cylinder 68 (in Z-direction).

Figure 27:
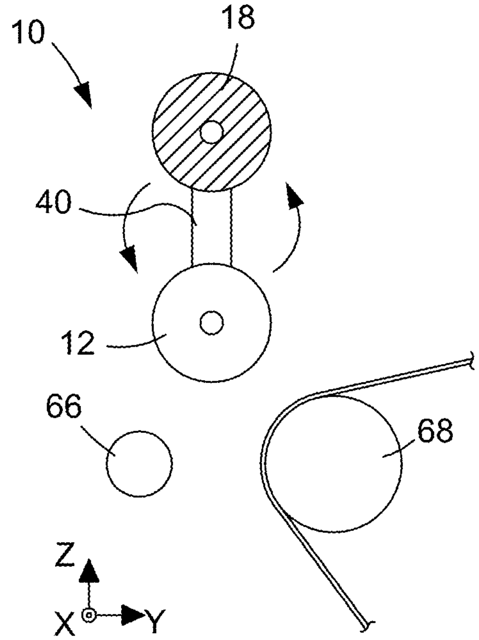
FIG. 27 shows a front view of the printing unit of FIG. 26 in a second state.

FIG. 27 shows the printing unit 10 in a second state after such movement. In this state, the carousel gripper 40 can rotate to exchange the first and second printing roller 12, 18.

Figure 28:
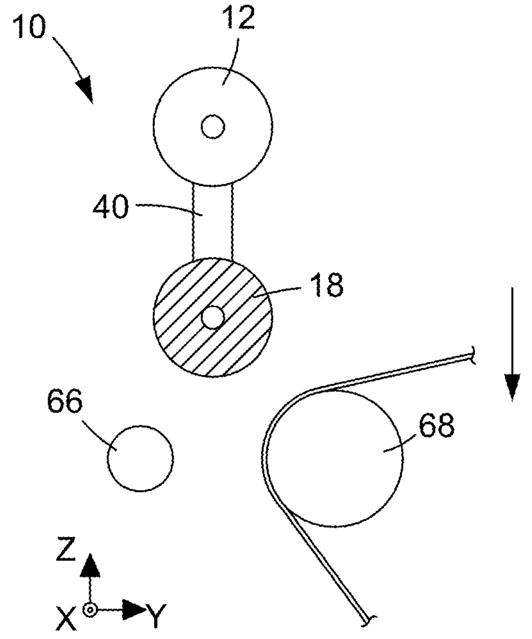
FIG. 28 shows a front view of the printing unit of FIG. 26 in a third state.

FIG. 28 shows the printing unit 10 in a third state after rotation of the carousel gripper 40. The carousel gripper 40 and thus the first and second printing roller 12, 18 can be moved back towards the anilox roller 66 and the impression cylinder 68 (in reverse Z-direction).

Figure 29:
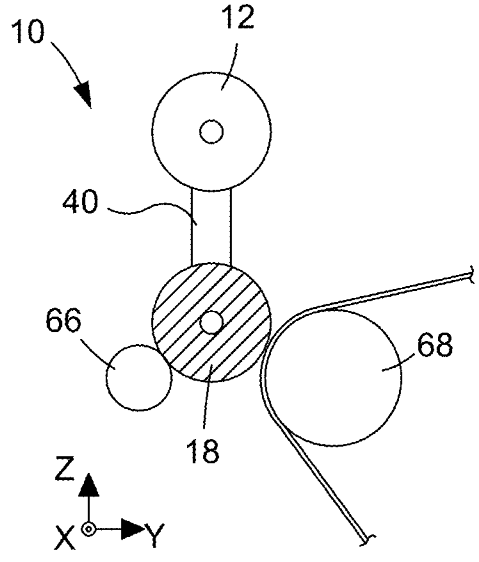
FIG. 29 shows a front view of the printing unit of FIG. 26 in a fourth state after finishing the printing roller change process.

FIG. 29 shows the printing unit 10 in a fourth state after completing the printing roller exchange. In this state, the second printing roller 18 is directly contacting the anilox roller 66 and impression cylinder 68. The first printing roller 12 can be accessed for servicing. Unlike in the first and second embodiment, the relative position of the anilox roller and impression cylinder can be maintained throughout the whole exchange process.

The invention claimed is:

1. A printing unit comprising a first printing roller with a first shaft, a second printing roller with a second shaft, a first mandrel configured to hold one of the shafts at a time, a second mandrel configured to hold one of the shafts at a time and a carousel gripper configured:

to translationally move in a printing position in an axis direction of the first and second printing roller to unplug the first shaft from the first mandrel and the second shaft from the second mandrel;

to rotate around an axis parallel to the axis of the first and second printing roller, thereby switching the position of the printing rollers; and to translationally move in an axis direction of the first and second printing roller to plug the first shaft to the second mandrel and the second shaft to the first mandrel.

2. The printing unit according to claim 1, wherein the carousel gripper is further configured:

to translationally move perpendicular to the axis direction of the first and second printing roller from the printing position into a home position; and to translationally move perpendicular to the axis direction of the first and second printing roller from the home position back to the printing position.

3. The printing unit according to claim 1, further comprising an anilox roller and an impression cylinder.

4. The printing unit according to claim 3, wherein the first printing roller or the second printing roller is located between the anilox roller and the impression cylinder and wherein the anilox roller and the first and/or second printing roller are configured to move apart from each other and from the impression cylinder, such that a free space for rotating the carousel gripper is formed.

5. The printing unit according to claim 3, wherein the anilox roller, the impression cylinder and the first and/or second printing roller are positioned such that their axis span a triangle, and wherein the first and/or second printing roller are/is configured to move apart from the anilox roller and the impression cylinder.

6. The printing unit according to claim 1, further comprising a first motor connected to the first mandrel and configured to rotate the first mandrel to control a printing process.

7. The printing unit according to claim 1, further comprising a motorized linear guide connected to the first mandrel and configured to move the first mandrel in an axis direction of the first printing roller.

8. The printing unit according to claim 1, further comprising a source of pressurized gas, wherein the second mandrel and the second shaft comprise a common central channel and wherein the source of pressurized gas is connected to the second mandrel such that pressurized gas can pass via the channel through the second mandrel and enter the first or second shaft.

9. The printing unit according to claim 1, further comprising a second motor connected to the carousel gripper and configured to rotate the carousel gripper.

10. The printing unit according to claim 9, wherein the second motor is further configured to rotate the carousel gripper in the printing position such that it simultaneously grips the first shaft and the second shaft or simultaneously ungrips the first shaft and the second shaft.

11. The printing unit according to claim 9, further comprising a pneumatic piston connected to a rotating shaft of the carousel gripper and configured to translationally move the carousel gripper in an axis direction of the first and second printing roller.

12. The printing unit according to claim 11, further comprising a linear guide with a U-shaped frame and a plate configured to move in the U-shaped frame, wherein the plate comprises a hole and wherein the rotating shaft of the carousel gripper passes through the hole.

13. The printing unit according to claim 12, wherein the second motor is located between the pneumatic piston and the linear guide.

14. A method to change printing rollers in a printing unit, the method comprising:

rotating a carousel gripper in a printing position such that it simultaneously grips a first shaft of a first printing roller and a second shaft of a second printing roller;

translationally moving the carousel gripper in the printing position in an axis direction of the printing rollers to unplug the first shaft from a first mandrel and the second shaft from a second mandrel;

rotating the carousel gripper around an axis parallel to the axis of the printing rollers, thereby switching the position of the printing rollers; and translationally moving the carousel gripper in an axis direction of the printing rollers to plug the first shaft to the second mandrel and the second shaft to the first mandrel.

15. The method according to claim 14, further comprising:

translationally moving the carousel gripper perpendicular to the axis direction of the printing rollers from the printing position into a home position; and translationally moving the carousel gripper perpendicular to the axis direction of the printing rollers from the home position back into the printing position.

* * * * *